United States Patent [19]

Staiger et al.

[11] Patent Number: 4,846,698

[45] Date of Patent: Jul. 11, 1989

[54] SEAL

[75] Inventors: Bruno Staiger, Erligheim; Klaus Schoch, Heilbronn-Horkheim, both of Fed. Rep. of Germany

[73] Assignee: Steuerungstechnik Staiger GmbH u.Co, Erligheim, Fed. Rep. of Germany

[21] Appl. No.: 126,223

[22] Filed: Nov. 25, 1987

[30] Foreign Application Priority Data

Mar. 14, 1987 [DE] Fed. Rep. of Germany ....... 3708393

[51] Int. Cl.$^4$ .............................................. H05K 1/00
[52] U.S. Cl. ..................................... 439/55; 439/271; 439/587; 439/490
[58] Field of Search ................................ 439/271–283, 439/55, 56, 68–74, 76, 77, 893, 345, 355, 360, 329, 493, 541, 558, 556, 559, 577, 586–589, 592, 696, 714, 731, 744, 746, 751, 869, 871, 873, 490

[56] References Cited

U.S. PATENT DOCUMENTS

| | | | |
|---|---|---|---|
| 2,782,391 | 2/1957 | Kirk | 439/279 |
| 3,994,552 | 11/1976 | Selvin | 439/278 |
| 4,186,987 | 2/1980 | Pearce, Jr. et l. | 439/279 |
| 4,516,820 | 5/1985 | Kuzma | 439/278 |
| 4,652,064 | 3/1987 | Centrone | 439/587 |
| 4,687,266 | 8/1987 | Tanii et al. | 439/271 |
| 4,702,712 | 10/1987 | Ghorbani et al. | 439/586 |

Primary Examiner—David Pirlot
Attorney, Agent, or Firm—Michael J. Striker

[57] ABSTRACT

A seal, particularly a flat seal to be arranged between two bodies, in particular a magnetic head and a plug socket with one part having at least one electrical plug and another part in which the plug is engageable and with at least one structural element, the seal comprises an electrical conductor printed circuit board arranged to provide an electrical contact between the electrical structural element and the plug, and a sealing mass in which the electrical printed circuit board is arranged, the sealing mass being formed as a pre-formed frame in which the printed circuit board is insertable.

18 Claims, 4 Drawing Sheets 4,846,698

SEAL

BACKGROUND OF THE INVENTION

The present invention relates generally to seals. More particularly, it relates to a seal and in particular a flat seal which is provided between two bodies, for example a magnetic head and a plug socket of a device, wherein one or more electrical plugs of one body are engageable in electrical contact bushes of the other body, and there is at least one electrical structural element which can electrically contact. with the plug through an electrical printed circuit board.

Seals of the above mentioned general type are known in the art. Such a seal is effective for protection against moisture, dirt and the like. It also has additional technical functions, and in particular it is used for integrally embedding a printed circuit board with electrical and/or electronic structural elements in a sealing elastomeric material. Thereby various additional functions, such as for example light indication, protection wiring and the like can be achieved in a compact sealed and integrated construction. One seal of this type is disclosed in the German patent application No. P 3610978.9. It is understood that the existing construction can further be improved.

SUMMARY OF THE INVENTION

Accordingly, it is an object of the present invention to provide a seal of the above-mentioned general type which insures a simple and cost-favorable manufacture and mounting thereof.

In keeping with these objects and with others which will become apparent hereinafter, one feature of the present invention resides, briefly stated in that a seal of the above-mentioned general type has printed circuit board which is insertable in a frame formed from a sealing mass.

When the seal is designed in accordance with the applicants' invention, it not only performs its sealing functions and the functions of accommodating respective electrical and/or electronic structural elements, but also is very simple and cost-favorable for manufacture and mounting In accordance with advantageous embodiments of the invention, the frame in which the printed circuit board is inserted can be formed as a snapping frame or as a hinged frame.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
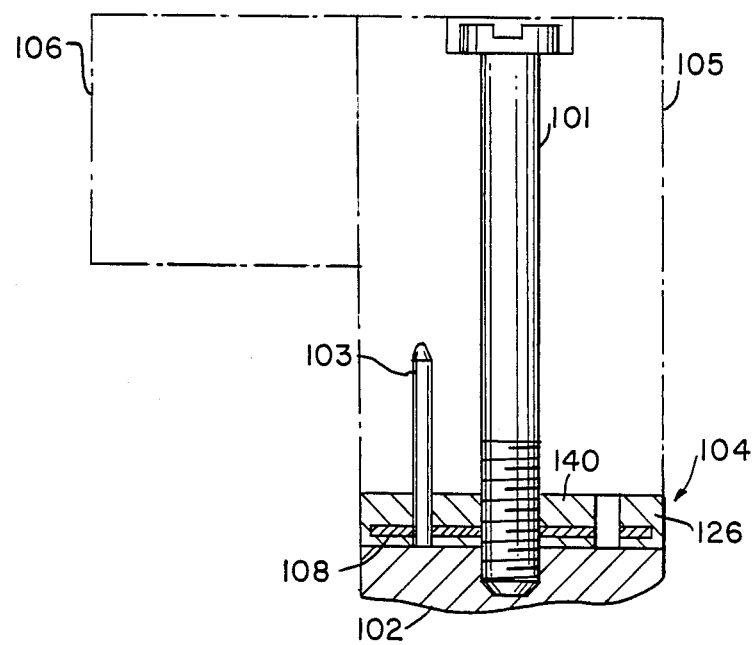
FIG. 1 is a side view of a seal in accordance with the present invention in an assembled condition between a magnetic head-connecting part and a device plug socket, partially in section.
Figure 2:
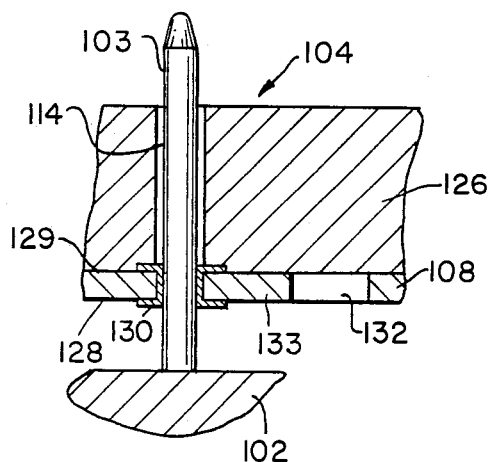
FIG. 2 is a view showing a fragment of the seal of FIG. 1 in accordance with the present invention on an enlarged scale.
Figure 7:
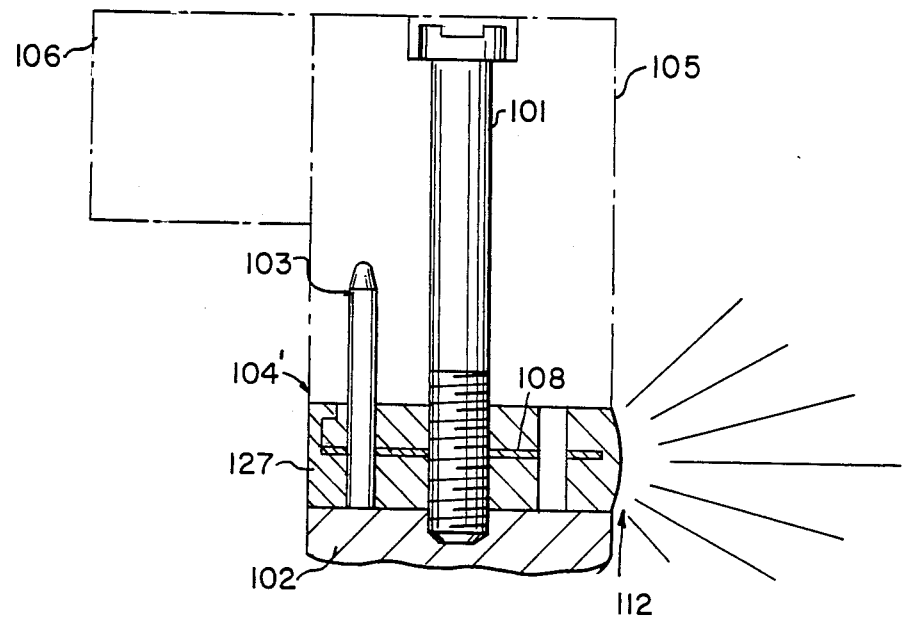
FIG. 7 is a view showing a seal in accordance with another embodiment of the present invention in an assembled condition between a magnetic head-connecting part and a device plug socket, partially sectioned and substantially similar to FIG. 1.

A connecting part 102 shown in FIGS. 1 and 7 is a component of a magnetic head of a not shown valve and has a plug 103. The plug 103 can be formed as a plug tongue and has a flat rectangle-shaped cross-section. It is also possible to form the plug 103 with a different cross-section, for example as a round plug pin with a circular cross-section. The plug 103 extends through a flat seal 104 which is arranged between the connecting part 102 and an electrical plug socket 105 of the device. The flat seal 104 can have a thickness of for example substantially between 1 and 3 mm. It is of course possible to make the flat seal 104 thinner or thicker.

The plug socket 105 is preferably standardized and has an anchoring screw 101 which extends through the plug socket 105 and the flat seal 104 and engages in an internal thread of the connecting part 102, so that the plug socket 105 is releasably mounted on the valve magnetic head. The plug 103 of the connecting part 102 engages in not shown contact bushes of the plug socket 105. The flat seal 104 ensures that no moisture or other contaminations can reach the region of the plug contact. A not shown electrical cable can be connected with an inlet part 106 of the plug socket 105 for supplying electrical voltage to the magnetic head through the contact bushes of the plug socket 105 and the plug 103 which extends through the flat seal 104.

The flat seal 104 is composed of an elastomer, or in another words of a rubber-elastic sealing mass, for example silicone rubber. The sealing mass is formed as a pre-molded flexible shaped part. This prefabricated sealing shaped part is formed in the embodiment of FIGS. 1–6 as a snapping frame 126 and in the embodiment of FIGS. 7–11 as a hinged frame 127. A printed circuit board 108 is located in the plane extending inside the thickness of the flat seal 104. It is inserted into the prefabricated elastic snapping frame 126 or the hinged frame 127 as a separately produced structural element subsequently to the production of the frames themselves. The printed circuit board 108 can preferably have a certain own stiffness and is relatively rigid. In special cases of application the printed circuit board 108 can favorably, however, be formed bendable and thereby respectively flexible.

The printed circuit board 108 can be provided with electrical conducting paths on one or both plate surfaces 128 and 129. It can also be provided with electrical or electronic structural elements, such as light diodes 112, bridge rectifiers and miniature structural parts (SMD-structural parts). The bridge rectifiers can be formed as polarization protection for the light diodes 112, so that not only in the event of alternating current operation, but also in the event of direct current operation the flat seal 104 can be arranged in respective position without consideration of a special pole direction. The structural elements which are provided inside the flat seal 104 on the printed circuit board 108 can be designed so that they can provide different operational circuits, such as time circuits, pulse circuits and the like, as well as a protective circuit of the magnetic head from excessive voltages and induction voltages.

Perforations 115 preferably of a rectangular shape are provided in the printed circuit board 108. The plug 103 can extend through these perforations. For insuring an unobjectionable electrical contacting with the plugs 103, contact sleeves 130 are provided in each perforation 115. The contact sleeves 130 extend from one plate surface 128 along the wall which limits the perforation 115 to the other plate surface 129 and have a substantially U-shaped cross-section as shown in FIGS. 2, 5, 6, 11. The free legs of the U-shaped sleeves lie on the plate surfaces 128, 129 and can contact with the conductor paths. The flat seal 104 also has throughgoing openings 114 for passage of the plug 103. The throughgoing openings 114 extend coaxially with the perforations 115 and can also have a substantially rectangular cross-section. The inner width of the throughgoing openings 114 is somewhat greater than the inner width of the perforations 115, so that the plug 103 can be inserted through the throughgoing openings 114 in substantially friction-free manner.

The flat seal 104 with the integrated conductor plate 108 can be provided as shown in the drawing, preferably with four throughgoing openings 114 and perforations 115 which are arranged at predetermined distances around a central opening 131 in accordance with the arrangement so that the flat seal 104 and/or the plug socket 105 can be plugged-in in another offset position. The anchoring screw 101 extends through the central opening 131. As can be seen from FIGS. 2, 4, 5, 6, 11, passages 133 are formed in the guiding plate 108. The passage 132 which is formed as a slot or an elongated opening is located at a small distance parallel to and near the perforation 115. A web-shaped plate part remains between the perforation 115 and the passage 132 and is relatively thin or small, so that a spring beam 133 is formed. This spring beam 133 can be flexibly bent in the plane of the conductor plate 108. During insertion of the plug 103 in the perforation 115, whose inner width is somewhat smaller than the thickness of the plug 103, the spring beam 133 can somewhat deviate in direction toward the passage 132. The spring beam 133 is under spring tension which acts permanently against the plug 103 so as to insure a continuous reliable electrical contacting. As can be seen from the drawings, the passage 132 and thereby the spring beam 133 are located in the region between the perforation 115 and the central opening 131.

Figure 3:
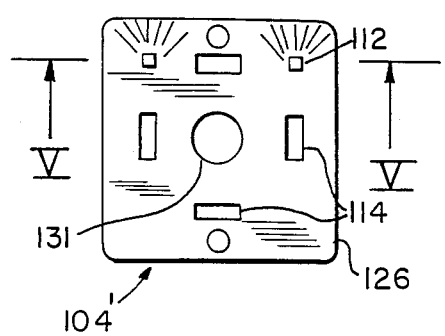
FIG. 3 is a front view of the seal of FIG. 1 in accordance with the present invention.
Figure 4:
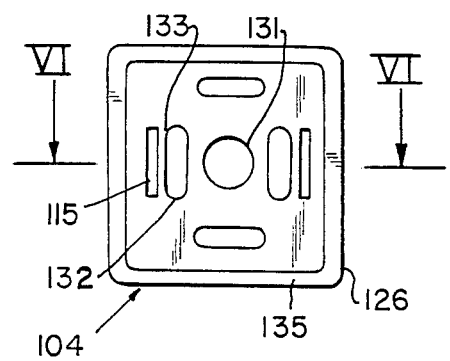
FIG. 4 is a rear view of the seal of FIG. 3 in accordance with the present invention.
Figure 5:
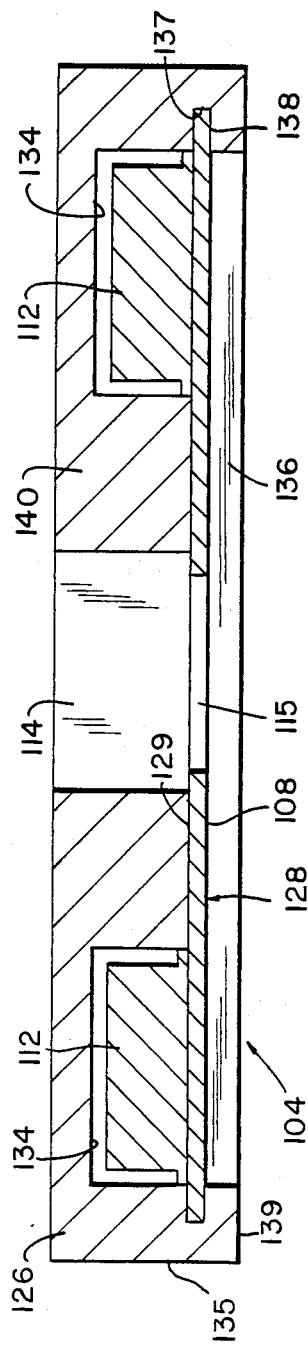
FIG. 5 is view showing a section of the inventive seal, taken along the line V—V in FIG. 3, on an enlarged scale.
Figure 9:
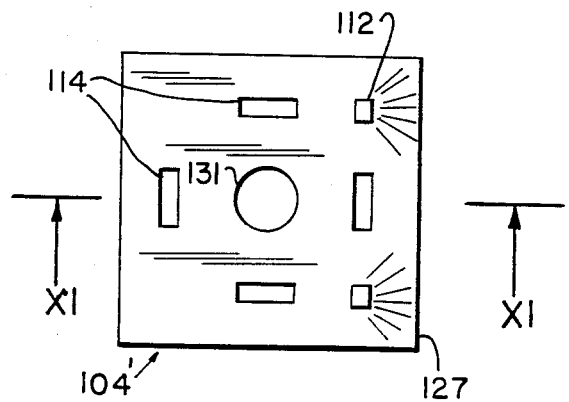
FIG. 9 is a front view of the seal of FIG. 7 in accordance with a second embodiment of the invention.
Figure 10:
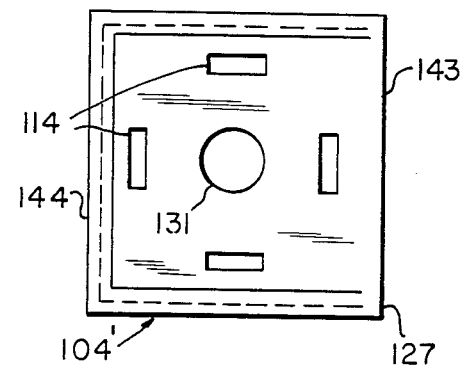
FIG. 10 is a rear view of the seal of FIG. 9 in accordance with the second embodiment of the present invention.

As can be seen from FIGS. 3 and 9, the light diodes 112 can be arranged advantageously in corner regions of the preferably square or rectangular conductor plate 108 and thereby also the flat seal 104. FIG. 5 shows that the electrical structural elements and first of all the light diodes 112 can be supported in a recess 134 inside the elastic sealing material of the snapping frame 126 and preferably contact the conductor plate 108 at its surface 129 which faces toward the flat seal 104.

Figure 6:
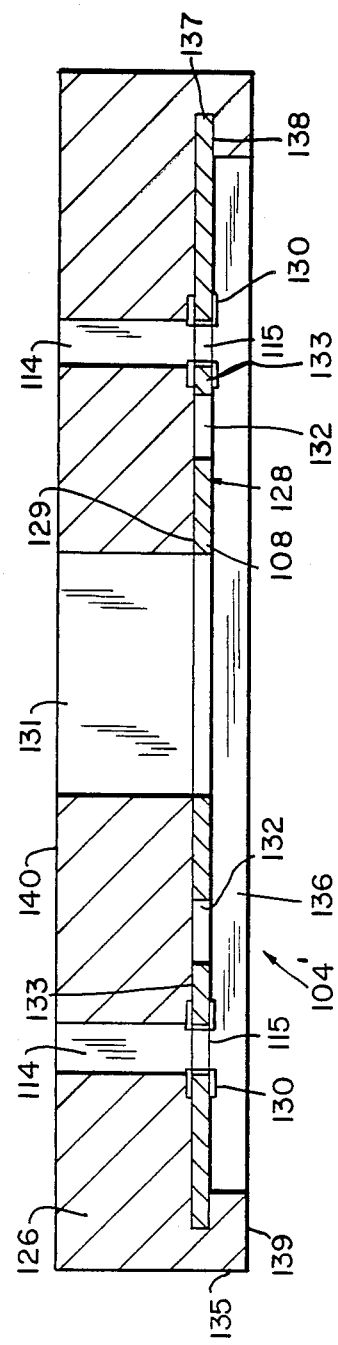
FIG. 6 is a view showing a section of the inventive seal, taken along the line VI—VI in FIG. 4 on an enlarged scale.

FIGS. 1, 4, 5 and 6 show that the snapping frame 126 is provided on its one (lower) side with an elastic holding web 135 which is preferably frame-shaped and circumferentially closed. The holding web 135 is relatively small, so that a cutout 136 is formed in its plane in the region of one (lower) plate surface 128, and the plate surface 128 at its lower side is substantially relieved. The holding web 135 is somewhat hook-shaped, as shown in FIGS. 5 and 6, and has a groove 137, in which the conductor plate 108 is held with its edge 135 in a form-locking manner. The holding web 135 engages thereby under the edge 138 of the conductor plate 108 and abuts against the lower surface 128 of the plate. The lower outer surface of the holding web 135 acts as a sealing surface 139 which abuts against the closing part 102. In a position when the flat seal 104 is turned by 180°, it can also abut against the plug socket 105. As specifically shown in FIGS. 5 and 6, the thickness of the holding web 135 from the sealing surface 139 to the lower free surface 128 of the conductor plate 108 is substantially smaller than the thickness of the snapping frame 126 at the opposite side, or in another words, from the other surface 128 to the opposite other sealing surface 140 with which the flat seal 104 abuts against the plug socket 105 in the shown embodiment in FIG. 1.

During the manufacture, the snapping frame 126 is produced as an independent mold part, and the guiding plate 108 with the light diode 112 and the like is produced as an independent structural part, separately from one another. During assembling the pre-fabricated parts, the rubber elastic snapping frame 126 is fitted over the conductor plate 108. The flexible holding web 135 form-lockingly engages over the edge 138 of the conductor plate, so that a reliable and at the same time releasable connection of the conductor plate 108 and the snapping frame 126 is ensured. Because of the releasable connection, there is an additional advantage that the conductor plate 108 when needed can be removed from the snapping frame 126 and replaced by another conductor plate which for example is provided with other electronic structural elements and another circuitry, so that individual adjustment to different requirements is possible.

The flat seal 104' in the embodiment shown in FIGS. 7-11 is formed substantially similar to the flat seal 104 of the first embodiment with respect to the conductor plate 108. An important difference in the flat seal 104' is that the printed circuit board 108 is provided not with a snapping frame, but instead with a rubber elastic hinged frame 127.

Figure 8:
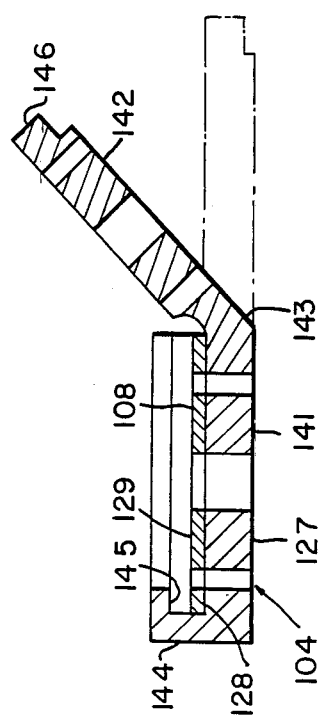
FIG. 8 is a side view of the seal of FIG. 7 in accordance with the present invention, in an open intermediate manufacturing position.
Figure 11:
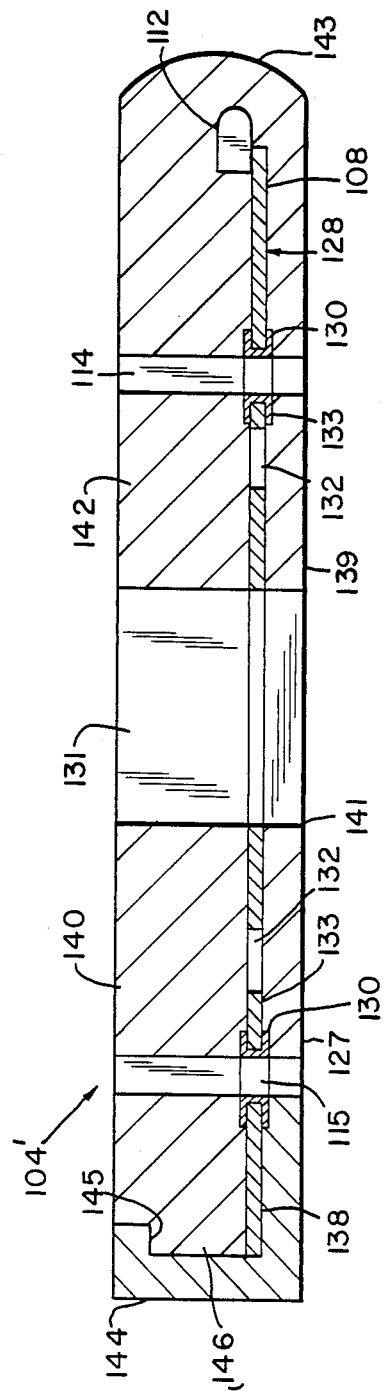
FIG. 11 is a view showing a section of the seal of the second embodiment taken along the line XI—XI in FIG. 9, on an enlarged scale.

The hinged frame 127 has a bottom 141 and a cover 142. The bottom 141 and the cover 142 can be formed with a substantially identical thickness as shown in FIGS. 7 and 8. In FIG. 11 it is shown that it is however favorable when the bottom 141 is formed thicker than the cover 142, and here the cover 142 can be somewhat 2–4 times thicker than the bottom 141.

The bottom 141 and the cover 142 can advantageously be formed as a material-unitary one-piece, prefabricated mold part and connected with one another by a hinge 143 which is formed as a so-called film hinge.

The film hinge 143 is located at one longitudinal side of the hinge frame 127 of the rectangular or square flat seal 104. At the other three longitudinal sides of the bottom, 141 hook-shaped lateral webs 144 are formed and engage the printed circuit board 108. The lateral webs 144 form a three-side frame part and are provided in a hook region with an angular undercut 145. The hook-shaped lateral web 144 engages the cover 142 on three longitudinal sides. The free hook end of the lateral web 144 engages in an edge-side stepped recess of the cover 142, and the cover edge is form-lockingly arrested in an undercut 145 of the lateral web 144 as shown in FIG. 11. The light diodes, 112 can advantageously be provided on the edge 135 of the printed circuit board 108, which faces toward the film hinge 143 or in the closing region of the film hinge 143, so that the light diode 112 is arranged in a specially protected manner.

As can be clearly seen from FIG. 8 during assembling of the flat seal 104 first the printed circuit board 108 is placed with its lower surface 128 onto the bottom 141 of the prefabricated elastic hinge frame 127. Then the cover 142 which is articulately connected by the film hinge 143 is turned in direction of the arrow until it abuts against the other surface 129 of the printed circuit board 108. The three lateral edges 147 of the cover 142 engage into the undercut 145 of the lateral web 144, whereby a releasable form-locking connection is produced. When needed, the cover 142 can be turned open and the printed circuit board 108 can be exchanged. For obtaining a nonreleasable continuous closure, it can be advantageous, however, to provide a glue connection in the region of the undercut 145, so that the lateral edges 146 become permanently fixably connected with the lateral web 144.

It will be understood that each of the elements described above, or two or more together, may also find a useful application in other types of constructions differing from the types described above.

While the invention has been illustrated and described as embodied in a seal, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A seal, particularly a flat seal to be arranged between two bodies, in particular a magnetic head and a plug socket with one body having at least one electrical plug and another body in which the plug is engageable, the seal comprising an electrical printed circuit board; and a sealing mass in which said electrical printed circuit board is arranged, said sealing mass being formed as a pre-formed frame in which said printed circuit board is insertable.

2. A seal as defined in claim 1, wherein said preformed frame in which said printed circuit board is insertable is formed as a snapping frame.

3. A seal as defined in claim 1, wherein said preformed frame in which said printed circuit board is insertable is formed as a hinged plate.

4. A seal as defined in claim 1, wherein said printed circuit board has a plurality of perforations, said frame having a central opening and a plurality of throughgoing openings for plugs, said throughgoing openings being arranged around said central opening at a distance therefrom and also formed coaxially to said perforations of said printed circuit board.

5. A seal as defined in claim 1, wherein said printed circuit board has two opposite surfaces and an edge, said frame having a groove in which said edge of said printed circuit board is held in a form-locking manner, said frame having an elastic holding web which engages over said edge of said printed circuit board in a hook-shaped manner, abuts against one of said surfaces of said printed circuit board, and is provided with a sealing surface.

6. A seal as defined in claim 5, wherein said holding web extends in a predetermined plane, said frame being provided in said plane with a cutout located on one side of said printed circuit board and being also provided with a recess at the other side of said printed circuit board for form-locking support of an electrical structural element.

7. A seal, particularly a flat seal to be arranged between two bodies, in particular a magnetic head and a plug socket with one body having at least one electrical plug and another body in which the plug is engageable, the seal comprising an electrical printed circuit board having two opposite surfaces and a perforation; a sealing mass in which said electrical printed circuit board is arranged, said sealing mass being formed as a preformed frame in which said printed circuit board is insertable; and a contacting element provided for the plug and extending through said perforation from one of said surfaces of said printed circuit board to the other of said surfaces of said electrical printed circuit board.

8. A seal as defined in claim 7, wherein said printed circuit board is provided, in addition to said perforation, with at least one passage and has a plate part arranged between said perforation and said passage and formed as a springy part.

9. A seal as defined in claim 8, wherein said frame has a central opening, said printed circuit board having a perforation, said passage and said spring part of said printed circuit board being arranged in the region between said central opening and said perforation.

10. A seal, particularly a flat seal to be arranged between two bodies, in particular a magnetic head and a plug socket with one body having at least one electrical plug and another body in which the plug is engageable, the seal comprising an electrical printed circuit board having two opposite surfaces; and a sealing mass in which said electrical printed circuit board is arranged, said sealing mass being formed as a pre-formed frame in which said printed circuit board is insertable, said frame having a bottom which lies on one of said surfaces of said printed circuit board and is provided with a sealing surface, and also a cover which lies on the other of said surfaces of said printed circuit board and is provided with another sealing surface.

11. A seal as defined in claim 10, wherein said bottom of said frame has a predetermined thickness, said cover of said frame having a thickness which is at least equal to the thickness of said bottom of said frame.

12. A seal as defined in claim 10, wherein said frame further has a hinge hingedly connecting said bottom and said cover of said frame with one another.

13. A seal as defined in claim 12, wherein said hinge is formed of one piece with said bottom and said cover of said frame.

14. A seal as defined in claim 12, wherein said printed circuit board has an edge which faces toward said hinge of said bottom and said cover and is arranged for supporting an electrical structural element.

15. A seal as defined in claim 10, wherein said bottom has a lateral web provided with an undercut, said cover being formed to engage in said undercut of said lateral web of said bottom to be fixed with said bottom.

16. A seal as defined in claim 15, wherein said frame is rectangular and has four sides, said lateral web of said bottom being provided on three of said sides of said frame.

17. A seal, particularly a flat seal to be arranged between two bodies, in particular a magnetic head and a plug socket with one body having at least one electrical plug and another body in which the plug is engageable, the seal comprising an electrical printed circuit board; a sealing mass in which said electrical printed circuit board is arranged, said sealing mass being formed as a pre-formed frame in which said printed circuit board is insertable; and a plurality of light diodes arranged in corner regions of said printed circuit board, said frame being formed light-permeable.

18. A seal, particularly a flat seal to be arranged between two bodies, in particular a magnetic head and a plug socket with one body having at least one electrical plug and another body in which the plug is engageable, the seal comprising an electrical printed circuit board having two opposite surfaces and an edge; and a sealing mass in which said electrical printed circuit board is arranged, said sealing mass being formed as a pre-formed frame in which said printed circuit board is insertable, said frame having a groove in which said edge of said printed circuit board is held in a form-locking manner, said frame having an elastic holding web which engages over said edge of said printed circuit board in a hook-shaped manner, abuts against one of said surfaces of said printed circuit board, and is provided with a sealing surface.

* * * * *